F. E. PROSSER.
PLANE METER.
APPLICATION FILED DEC. 9, 1910.
994,951.
Patented June 13, 1911.
2 SHEETS—SHEET 1.
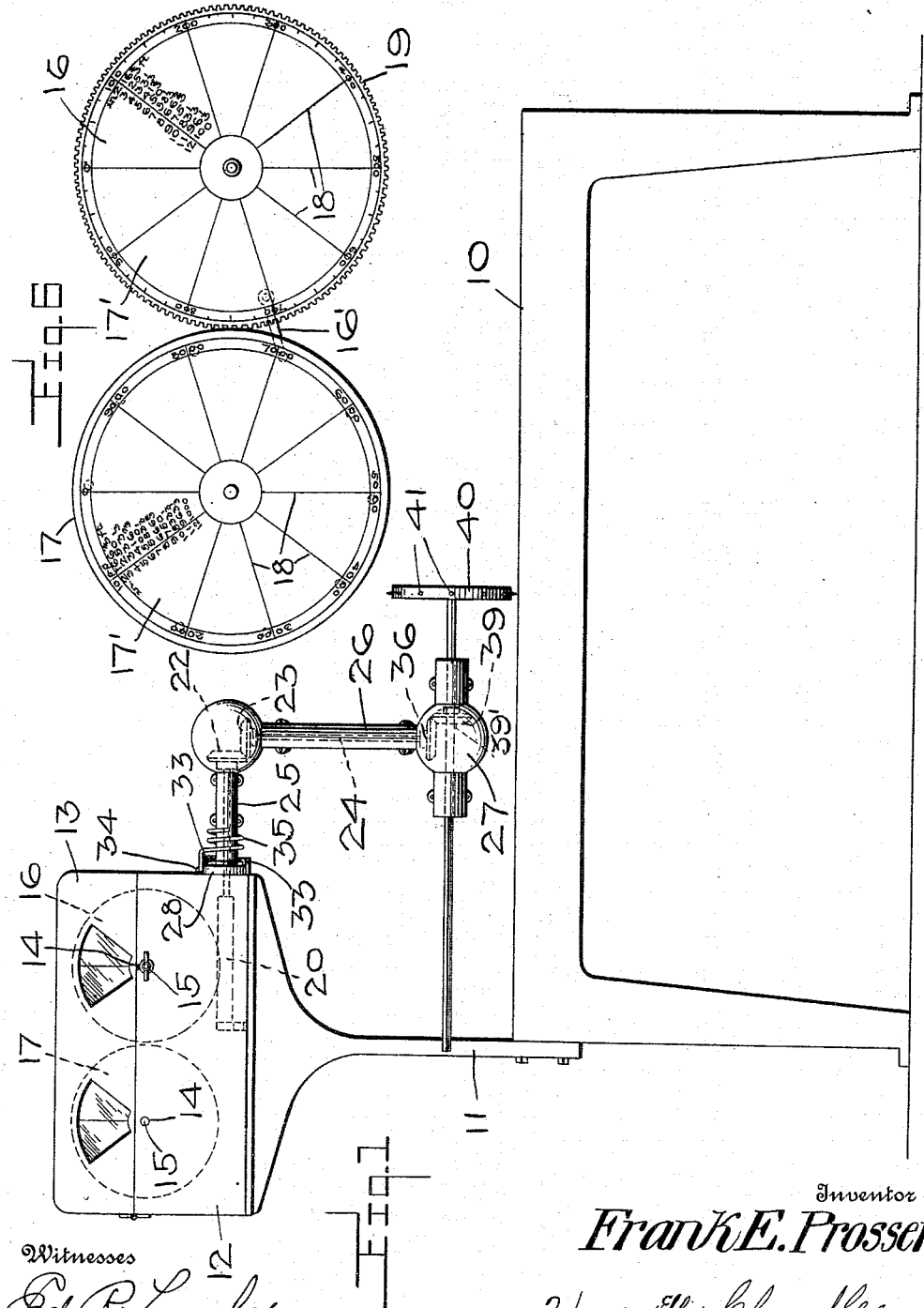
Inventor
Frank E. Prosser
By Harry Ellis Chandlee
Attorney
Witnesses
Ed. R. Lusby
Harry M. Feet

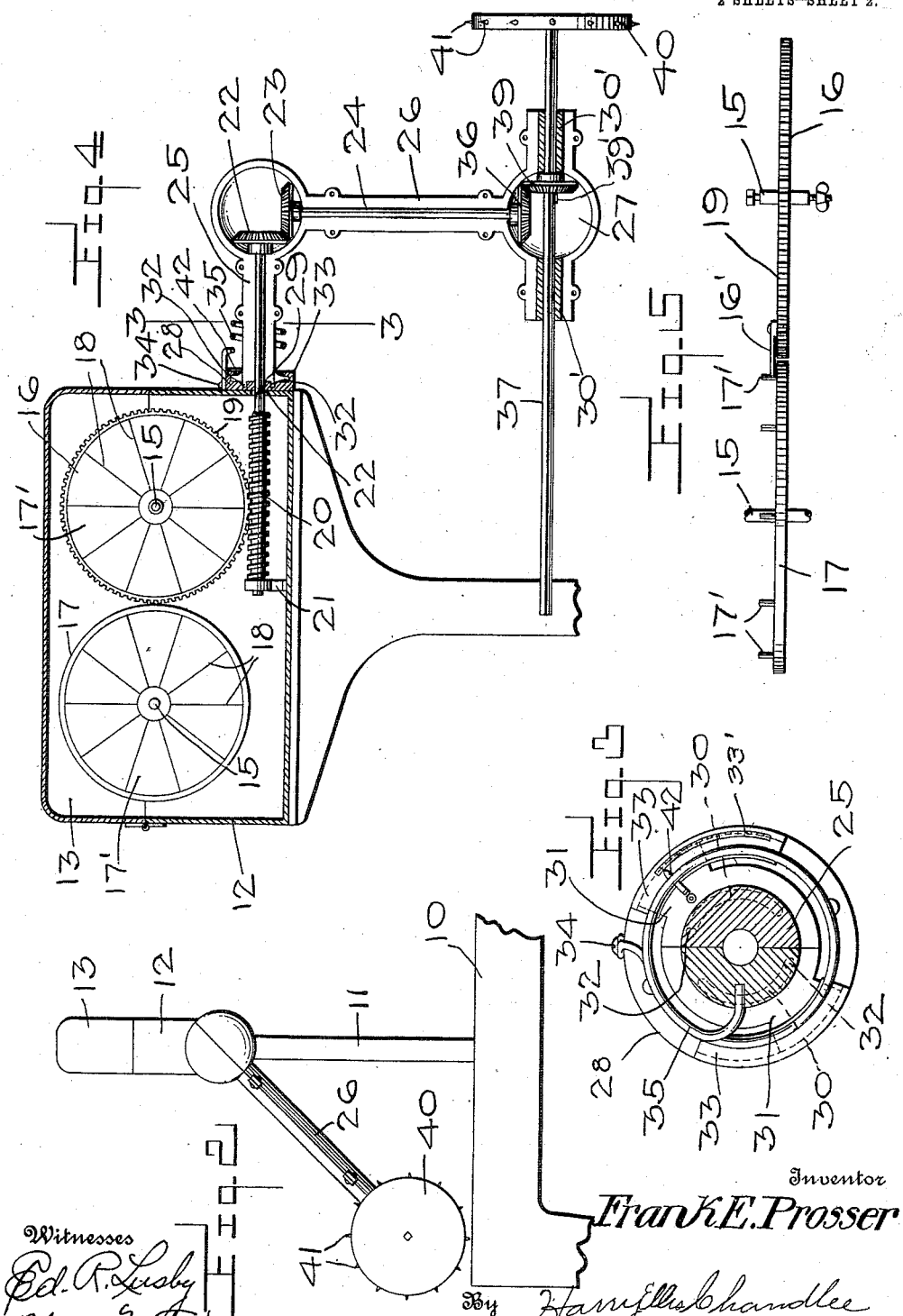

UNITED STATES PATENT OFFICE.

FRANK E. PROSSER, OF GLENNVILLE, GEORGIA.

PLANE-METER.

994,951.  Specification of Letters Patent.  Patented June 13, 1911.

Application filed December 9, 1910. Serial No. 596,477.

*To all whom it may concern:*

Be it known that I, FRANK E. PROSSER, a citizen of the United States, residing at Glennville, in the county of Tattnall and State of Georgia, have invented certain new and useful Improvements in Plane-Meters, of which the following is a specification.

This invention relates to improvements in measuring devices, and has particular reference to a device of this character to be attached to wood planing machines to measure the number of feet passing through the machine.

Another object is to provide a device of this character which will measure and indicate the total number of feet of lumber passing through the machine according to the width of the lumber.

Other objects and advantages will be apparent from the following description, and it will be understood that changes in the specific structure shown and described may be made within the scope of the claims without departing from the spirit of the invention.

In the drawings: Figure 1 is a front elevation of the device, applied to a planer. Fig. 2 a side elevation of the same. Fig. 3 a section on the line 3—3 of Fig. 4, Fig. 4 an enlarged detail of the device in section, Fig. 5 a top plan view of the register casing shown open, and Fig. 6 is an enlarged face view of the register disks.

In the drawings: 10 represents the bed of a planing machine. On a portion of the bed is a vertical support 11 to which my device is secured. On the upper end of the support 11 is secured a casing 12 having a hinged cover 13, and in the upper edge of the lower portion of the casing, are formed the bearing recesses 14 which support the shafts 15 of counter wheels 16 and 17 respectively. The wheel 16 which is the hundreds wheel is divided into a plurality of radial sections 17' by means of the radiating lines 18, and on the left of each of the lines is a vertical series of numbers representing various widths of lumber, and on the right of these lines the total number of feet for each individual width of lumber which has passed through the machine while the wheel 16 rotates from one line 18 to the next. The dial is numbered near its outer periphery with numbers from 100 to 1000 feet, but these graduations may be varied as desired. The markings may be in 5's, 10's, 25's and 50's, as desired. The thousands wheel has the numbers from 1000 to 10,000 near its outer periphery, and is also divided radially as the other wheel, with the widths represented on the left of each of the lines and on the right of the lines, the total number of feet for each of these widths ten times as much as shown on the hundreds wheel. Thus 100 feet of lumber 2 inches wide passing through the machine would make 16⅔ feet of planed lumber, and correspondingly, the same number of feet of lumber 5 inches wide would make 41⅔ feet.

The outer periphery of the hundreds wheel 16 is formed with teeth 19 adapted to be engaged by the worm shaft 20 mounted in the bearings 21 and 22 in the lower portion of the casing 12. This worm shaft extends outwardly from the casing, and has on its end a beveled pinion 22 adapted to mesh with the pinion 23 on the vertical shaft 24. A casting comprising the outwardly extending portion 25, the downwardly pendent portion 26 and the enlarged portion 27 on the lower end of the portion 26 is mounted to swing on the casing 12. Secured on the casing 12 is a disk 28 which has a central opening 29 for the shaft 20 to pass through, and two arcuate slots 30. On the portion 25 of the casting is a flange 31 from the face of which extend integral lugs 32 adapted to enter and play in the slots 30, the end walls of the slots limiting the rocking motion of the portion 25. The flanges 31 extend vertically and are adapted to be confined by the retaining flanges 33 formed on the upper and lower portions of the outer face of the disk 28. Secured to one end at 34 is a coiled spring 35 which has a few turns made around the portion 25, and has its opposite end secured to the portion 25. This spring is so arranged that the casting will be held normally in a vertically depending position, and be returned to this position when turned therefrom.

The portion 26 of the casting is formed with a longitudinal bore for the shaft 24, and a recess near its lower end for a beveled pinion 36, the enlarged portion 27 of the casting having a shaft 37 passing through a suitable bar formed therein which is mounted in suitable bearings 30'. This shaft 37 carries a beveled pinion 39 which meshes with the above mentioned pinion 36. The shaft 37 projects outwardly from the lower portion of the casting, and has mounted thereon, a wheel 40 provided on its periphery with a circular series of pins or spikes 41.

On the outer face of the upper flange 33 is formed a series of graduations 33' in fractions of an inch, over which is adapted to move a pointer 42 formed on the uppermost of the flanges 31 which indicates the swinging of the casting and shows the thickness of the lumber planed.

In the operation of the device in connection with the planer a piece of lumber of a predetermined width, for instance 5 inches is passed through the machine. The end of the piece of lumber will pass under and be engaged by the pins of the wheel 40 which will cause a rotation of said wheel to transmit motion through the above mentioned shafts and beveled pinions to the worm shaft 20 which will rotate the wheel or dial 16 as long as the piece of lumber engages the wheel 40. Upon the completion of the passage of the lumber through the machine, the dial 16 will have rotated to indicate the number of feet contained in the length of the piece of lumber, and upon inspection of said dial, there will be found the total number of feet in said piece of lumber indicated opposite the width of the same. When the dial 16 has been rotated to indicate that one thousand feet of lumber have passed through the machine, the dial 16 will transfer the motion to the dial 17, advancing the same one space. On the disk 17 at suitable intervals, preferably at the points where the lines 18 are situated, are secured lugs 17'' and on the disk 16 is secured a single lug 16', at a point such that when the disk 16 has nearly made a complete revolution, this lug 16' will engage one of the lugs on the other disk and move it a distance of one space.

To compensate for the varying thickness of lumber, the casting carrying the wheel 40 will be swung up or down to permit the lumber to pass thereunder, the spring 35 holding the wheel 40 in positive engagement with the lumber. When it is necessary to inspect or repair the parts, the casting may be swung until the flanges 31 are turned from under the flange 33 and the device may be drawn from the casing 12.

This device is also adapted to be used with timber machines, and to adapt it for such a use, I substitute another set of register dials having different sets of graduations of widths and thicknesses over one inch.

The shaft 37 has the beveled pinion 39 splined thereon as at 39', and said shaft is adapted to slide through the bearings in the lower portion of the casting so that the wheel 40 may be made to contact with the face of the lumber whether of greater or lesser widths. Thus the wheel 40 may be shifted within a wide range.

What is claimed is:

1. A lumber measurer for a planing machine, comprising a support on the machine, registering dials on the support, a swinging spring pressed member on the support, a spike wheel on said swinging member for engagement with a piece of lumber, and means between said spike wheel and said registering dials for indicating the thickness of lumber passing through the machine.

2. A lumber measurer for a planing machine comprising a support on the machine, a casing on the support, registering dials mounted in the casing, said dials having a table of measurements thereon, a worm shaft, a swinging member on said worm shaft, flanges on said swinging member, means on said swinging member to limit its movement, means on the casing to be engaged by said limiting means, a lumber engaging wheel mounted in said swinging member, connections between said wheel and the registering disks, a coiled spring on said swinging member having one end secured to said casing and the opposite end to said swinging member.

3. A lumber measurer for a planing machine comprising a support, registering dials on said support, a swinging member on said support, said swinging member carrying shafts and meshing pinions, a lumber engaging wheel in the swinging member, a spring between the swinging member and the register, a plate on said register having arcuate slots and curved guiding flanges, oppositely disposed flanges on the swinging member for engagement with the flanges, and pins on the swinging member for engagement in the arcuate slots to limit the movement of said swinging member.

4. A lumber measurer for a planing machine comprising a support, registering dials on said support, a swinging member on said support, said swinging member carrying shafts and meshing pinions, a lumber engaging wheel on the swinging member, a spring between the swinging member and the register, a plate on said register having arcuate slots and curved guiding flanges, oppositely disposed flanges on the swinging member for engagement with the flanges, and pins on the swinging member for engagement in the arcuate slots to limit the movement of said swinging member, one of said curved flanges having graduations, and said swinging member having a pointer adapted to travel over said graduations to indicate the thickness of the lumber.

In testimony whereof I affix my signature, in the presence of two witnesses.

FRANK E. PROSSER.

Witnesses:
PAUL F. GROVE,
H. ELLIS CHANDLEE.

Copies of this patent may be obtained for five cents each, by addressing the "Commissioner of Patents, Washington, D. C."